(12) United States Patent
Alhuwaishel

(10) Patent No.: US 8,919,034 B2
(45) Date of Patent: Dec. 30, 2014

(54) FISH TRAP SYSTEM

(76) Inventor: Fahad M. F. S. Alhuwaishel, Hadiya (KW)

( * ) Notice: Subject to any disclaimer, the term of this patent is extended or adjusted under 35 U.S.C. 154(b) by 417 days.

(21) Appl. No.: 13/460,636

(22) Filed: Apr. 30, 2012

(65) Prior Publication Data

US 2013/0167428 A1    Jul. 4, 2013

Related U.S. Application Data

(60) Provisional application No. 61/582,803, filed on Jan. 3, 2012.

(51) Int. Cl.
*A01K 69/06* (2006.01)
*A01K 69/08* (2006.01)
*A01K 69/00* (2006.01)

(52) U.S. Cl.
USPC ..................................... 43/100; 43/17; 43/64

(58) Field of Classification Search
USPC .................................. 43/17, 100–105, 58, 64
See application file for complete search history.

(56) References Cited

U.S. PATENT DOCUMENTS

| | | | | |
|---|---|---|---|---|
| 132,476 | A * | 10/1872 | Livaudais | 43/105 |
| 254,989 | A * | 3/1882 | Marshall | 43/101 |
| 872,556 | A * | 12/1907 | Carwile | 43/100 |
| 1,146,911 | A * | 7/1915 | Wilkerson | 43/102 |
| 1,667,700 | A * | 4/1928 | Hanken | 43/104 |
| 2,731,761 | A * | 1/1956 | Marshall | 43/100 |
| 3,040,980 | A * | 6/1962 | Mann et al. | 43/100 |
| 3,318,039 | A * | 5/1967 | MacDonald et al. | 43/100 |
| 3,319,373 | A * | 5/1967 | Gale et al. | 43/100 |
| 3,337,982 | A * | 8/1967 | Sajulan | 43/100 |
| 3,508,358 | A * | 4/1970 | Lee | 43/17 |
| 3,754,348 | A * | 8/1973 | Ramsey | 43/103 |
| RE27,862 | E * | 1/1974 | Silchenstedt | 43/17 |
| 3,815,279 | A * | 6/1974 | Poirot | 43/105 |
| 3,821,861 | A * | 7/1974 | Jalbert | 43/100 |
| 3,992,804 | A * | 11/1976 | Senese | 43/100 |
| 4,046,996 | A * | 9/1977 | Williams et al. | 43/56 |
| 4,206,562 | A * | 6/1980 | Quevedo | 43/102 |
| 4,312,296 | A * | 1/1982 | Stelleman et al. | 119/223 |
| 4,411,092 | A * | 10/1983 | Lalancette | 43/100 |
| 4,434,575 | A * | 3/1984 | Pearson | 43/100 |
| 4,437,255 | A * | 3/1984 | Reed | 43/17 |

(Continued)

FOREIGN PATENT DOCUMENTS

| | | | | |
|---|---|---|---|---|
| DE | 10126225 A1 * | 12/2002 | | A01K 69/08 |
| DE | 10346789 B3 * | 2/2005 | | A01K 69/06 |

(Continued)

*Primary Examiner* — Darren W Ark
(74) *Attorney, Agent, or Firm* — Richard C. Litman

(57) ABSTRACT

The fish trap system includes an enclosure having a revolving trap door attached to a coned gate Gargoor. Still and video cameras are included in the enclosure to provide snapshot and moving pictures of fish caught in the trap. A buoy (float) is included, from which images of fish in the enclosure are relayed via digital link to the user on the Internet. Moreover, user-controlled electrical gates are provided to either retain a fish or release a fish by closing and opening the gates via the Internet connection. The video camera, being disposed in the trap housing, is movable and provides views of the area around the fish trap when submerging the trap until it reaches the ground in order to locate the right flooring for the fish trap. Aside from fishing purposes, the fish trap system may be used for experimental purposes.

20 Claims, 12 Drawing Sheets

(56) References Cited

U.S. PATENT DOCUMENTS

| | | | |
|---|---|---|---|
| 4,516,348 A * | 5/1985 | Hirose et al. | 43/17 |
| 4,743,742 A * | 5/1988 | Espedalen | 119/215 |
| 4,744,331 A * | 5/1988 | Whiffin | 119/223 |
| 4,831,774 A * | 5/1989 | Gonzalez | 43/100 |
| 4,959,922 A * | 10/1990 | Rhodes | 43/100 |
| 4,980,989 A * | 1/1991 | Davis | 43/100 |
| 4,982,525 A * | 1/1991 | Miller | 43/105 |
| 5,133,149 A * | 7/1992 | Smyly, Sr. | 43/100 |
| 5,170,581 A * | 12/1992 | Lyons | 43/17 |
| 5,222,458 A * | 6/1993 | Pippy | 119/247 |
| 5,331,148 A * | 7/1994 | Kvassheim | 250/221 |
| 5,483,767 A * | 1/1996 | Langer | 43/4 |
| 5,511,335 A * | 4/1996 | Langer | 43/4 |
| 5,546,695 A * | 8/1996 | Langer | 43/44.98 |
| 5,555,666 A * | 9/1996 | Glatzer | 43/17 |
| 5,566,499 A * | 10/1996 | Washecka | 43/100 |
| 5,581,930 A * | 12/1996 | Langer | 43/17 |
| 5,684,755 A * | 11/1997 | Saunders | 43/17 |
| 5,782,033 A * | 7/1998 | Park et al. | 43/17 |
| 5,894,694 A * | 4/1999 | Erlandson | 43/100 |
| 6,247,264 B1 * | 6/2001 | Prosol | 43/100 |
| 6,584,722 B1 * | 7/2003 | Walls et al. | 43/4 |
| 6,775,946 B2 * | 8/2004 | Wright | 43/58 |
| 7,026,942 B2 * | 4/2006 | Cristofori et al. | 43/58 |
| 7,108,213 B2 * | 9/2006 | Hitomi et al. | 43/4 |
| 7,317,399 B2 * | 1/2008 | Chyun | 43/58 |
| 7,509,770 B2 * | 3/2009 | Gardner et al. | 43/58 |
| 7,530,195 B2 * | 5/2009 | Muller et al. | 43/58 |
| 7,540,109 B2 * | 6/2009 | Hall | 43/58 |
| 7,669,360 B2 * | 3/2010 | Davidson | 43/17 |
| 7,905,440 B2 * | 3/2011 | Ikuta et al. | 43/4 |
| 8,104,221 B2 * | 1/2012 | Walter et al. | 43/58 |
| 8,112,934 B2 * | 2/2012 | Alter et al. | 43/58 |
| 8,359,783 B1 * | 1/2013 | Kamery et al. | 43/58 |
| 8,375,623 B2 * | 2/2013 | Havens et al. | 43/100 |
| 8,553,501 B1 * | 10/2013 | Cota | 43/100 |
| 8,635,806 B2 * | 1/2014 | Gardner et al. | 43/58 |
| 8,651,057 B1 * | 2/2014 | Welsh | 119/200 |
| 8,776,430 B1 * | 7/2014 | Kamery et al. | 43/58 |
| 2005/0097808 A1 * | 5/2005 | Vorhies et al. | 43/58 |
| 2005/0162976 A1 * | 7/2005 | Kuriyama et al. | 367/111 |
| 2005/0229477 A1 * | 10/2005 | Gomez | 43/100 |
| 2006/0150470 A1 * | 7/2006 | Ronnau | 43/58 |
| 2006/0265941 A1 * | 11/2006 | Newton | 43/58 |
| 2008/0000429 A1 * | 1/2008 | Page | 119/223 |
| 2008/0236023 A1 * | 10/2008 | Thomas et al. | 43/58 |
| 2010/0313465 A1 * | 12/2010 | Haugen | 43/100 |
| 2011/0167709 A1 * | 7/2011 | Pinkston | 43/61 |
| 2011/0315085 A1 * | 12/2011 | Lindgren | 119/223 |
| 2012/0006277 A1 * | 1/2012 | Troy et al. | 119/223 |

FOREIGN PATENT DOCUMENTS

| | | | | |
|---|---|---|---|---|
| FR | 2656498 A1 * | 7/1991 | | A01K 69/08 |
| JP | 02183192 A * | 7/1990 | | A01K 69/00 |
| JP | 07203807 A * | 8/1995 | | A01K 69/00 |
| JP | 2000189000 A * | 7/2000 | | A01K 69/00 |
| JP | 2002136245 A * | 5/2002 | | A01K 69/06 |
| JP | 2005073637 A * | 3/2005 | | A01K 69/10 |
| JP | 2006109836 A * | 4/2006 | | A01K 69/08 |
| JP | 2008142027 A * | 6/2008 | | A01K 69/04 |

* cited by examiner

FISH TRAP SYSTEM

CROSS-REFERENCE TO RELATED APPLICATION

This application claims the benefit of U.S. Provisional Patent Application Ser. No. 61/582,803, filed Jan. 3, 2012.

BACKGROUND OF THE INVENTION

1. Field of the Invention

The present invention relates to fishing equipment, and more particularly to a fish trap system that provides an electronically and remotely controlled fish trap system.

2. Description of the Related Art

A Gargoor is a traditional fishing tool used in Kuwait and other Gulf Countries. A Gargoor is simply a coned gate fish trap made from chicken wire. However, when placing the Gargoor underwater, the fisherman will not be able to know what type of fish he caught, or if the trap caught any fish at all, until he pulls the fish trap out of the water. Moreover, he doesn't have a choice or control over what the fish trap catches. Modifications to the Gargoor should be made to remedy these drawbacks.

Thus, a fish trap system solving the aforementioned problems is desired.

SUMMARY OF THE INVENTION

The fish trap system is a device to be connected to a Gargoor. A revolving trap door attaches to the coned gate Gargoor. Still and video cameras are included to provide snapshot and moving pictures of fish caught in the trap. Images are relayed via digital link to the user on the Internet. Moreover, user-controlled electrical gates are provided to either retain a fish or release a fish by closing and opening the gates via the Internet connection. The video camera is movable and is disposed in the trap housing to provide views of the area around the fish trap when submerging the trap until it reaches the ground in order to locate the right flooring for the fish trap. Aside from fishing purposes, the fish trap system may be used for experimental purposes as well.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
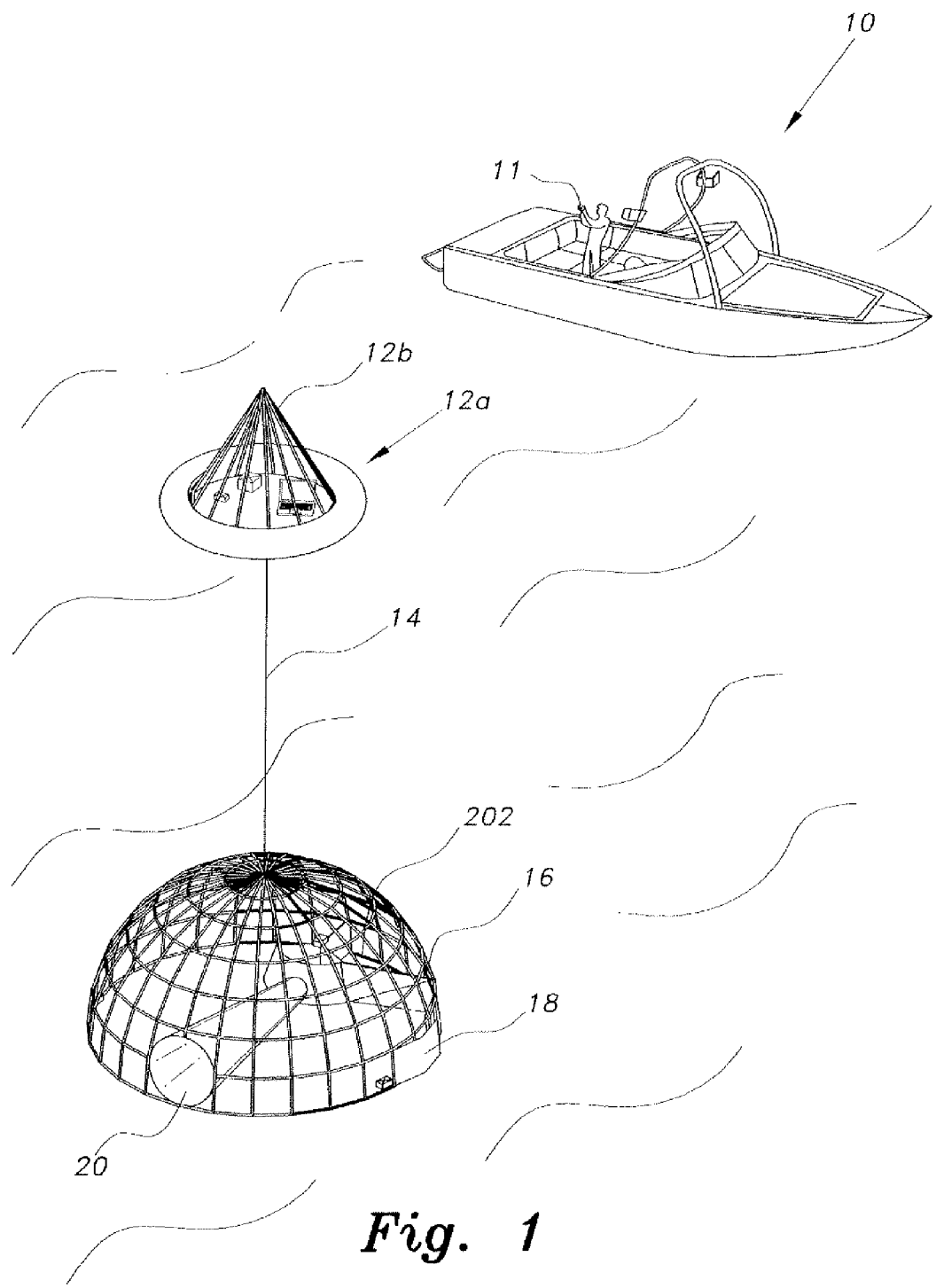
FIG. 1 is an environmental, perspective view of a fish trap system according to the present invention.
Figure 2:
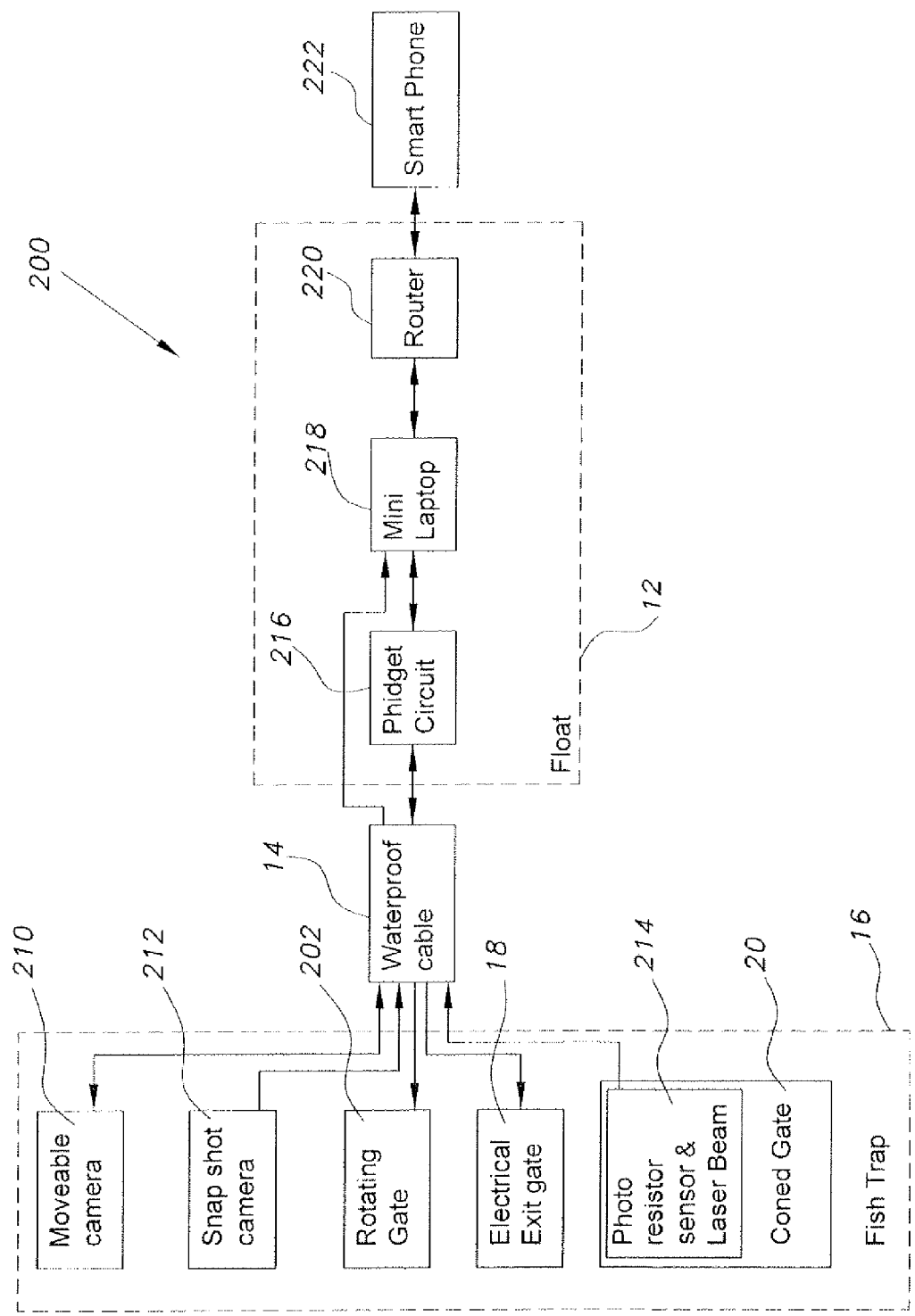
FIG. 2 is a block diagram of a fish trap system according to the present invention.
Figure 3:
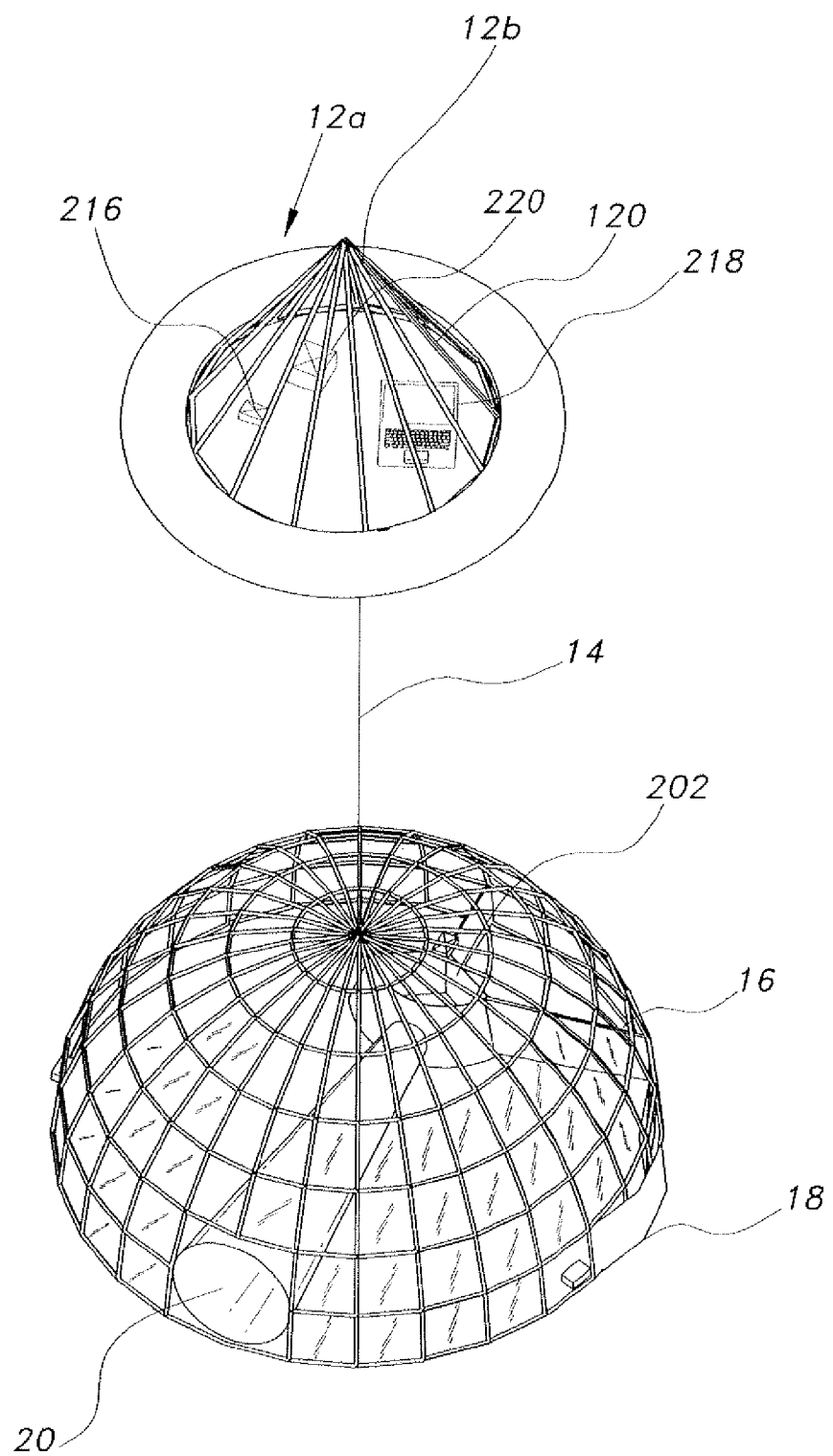
FIG. 3 is a detailed environmental perspective view of a float for a fish trap system according to the present invention.

As shown in FIGS. 1-3, the fish trap system 10 includes a movable camera 210, a snapshot camera 212 which can be a digital still camera, a rotating gate 202, a safety electrical gate 18 and a photoresistor sensor and laser beam combination 214 attached directly to the fish trap 16. The fish trap 16 is a geodesic mesh enclosure having moving structures inside that trap or release fish entrained in the geodesic enclosure at the remote command of an operator. A coned trap mechanism 20 has a large opening at the wall of the geodesic enclosure, the coned mechanism 20 tapering as it extends towards the center of the geodesic enclosure. The coned trap mechanism 20 functions as a guideway for the fish to a temporary trap enclosure. A waterproof cable 14 operably connects these components to a mini laptop 218 indirectly by using a Phidget circuit 216 (a plug and play" building block circuit for low cost USB sensing and control) in between. In case of vision display for both the movable-web-camera and Snapshot-Camera, some cables are connected directly to the USB Port of the Mini laptop 218 without using the Phidget circuit 216. To provide a long distance wireless Internet connection, a router 220 is added to the system. RMD (Remote Desktop Display) software is used, which is installed in both the mini laptop 218 and a remote WLAN-enabled device such as any Smartphone 222 the user 11 has in order to provide the connection between the user 11 and the fish trap through the Internet. The user 11 can remotely control the trap system while in his boat 10.

Figure 4:
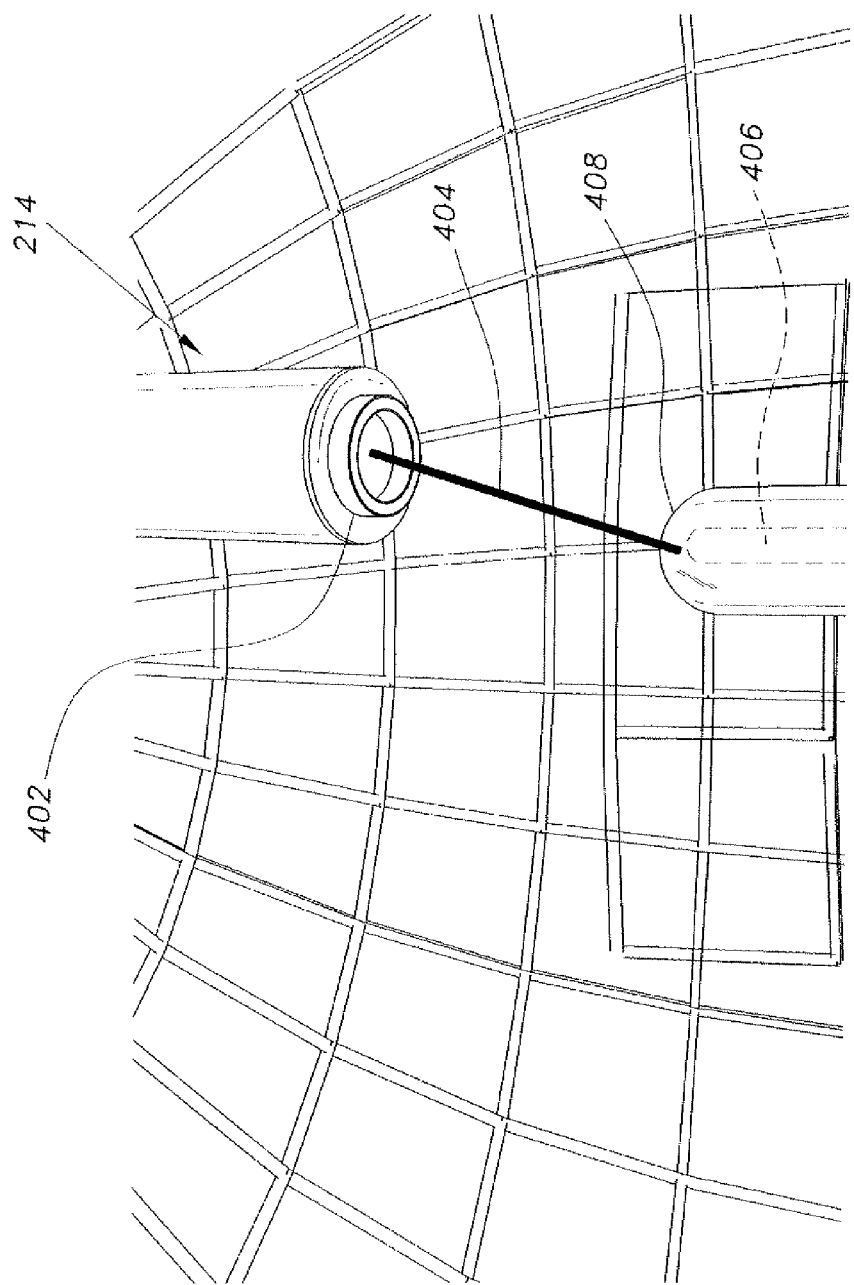
FIG. 4 is a partial perspective view of a fish trap system according to the present invention, showing a laser and sensor inside the trap.
Figure 12:
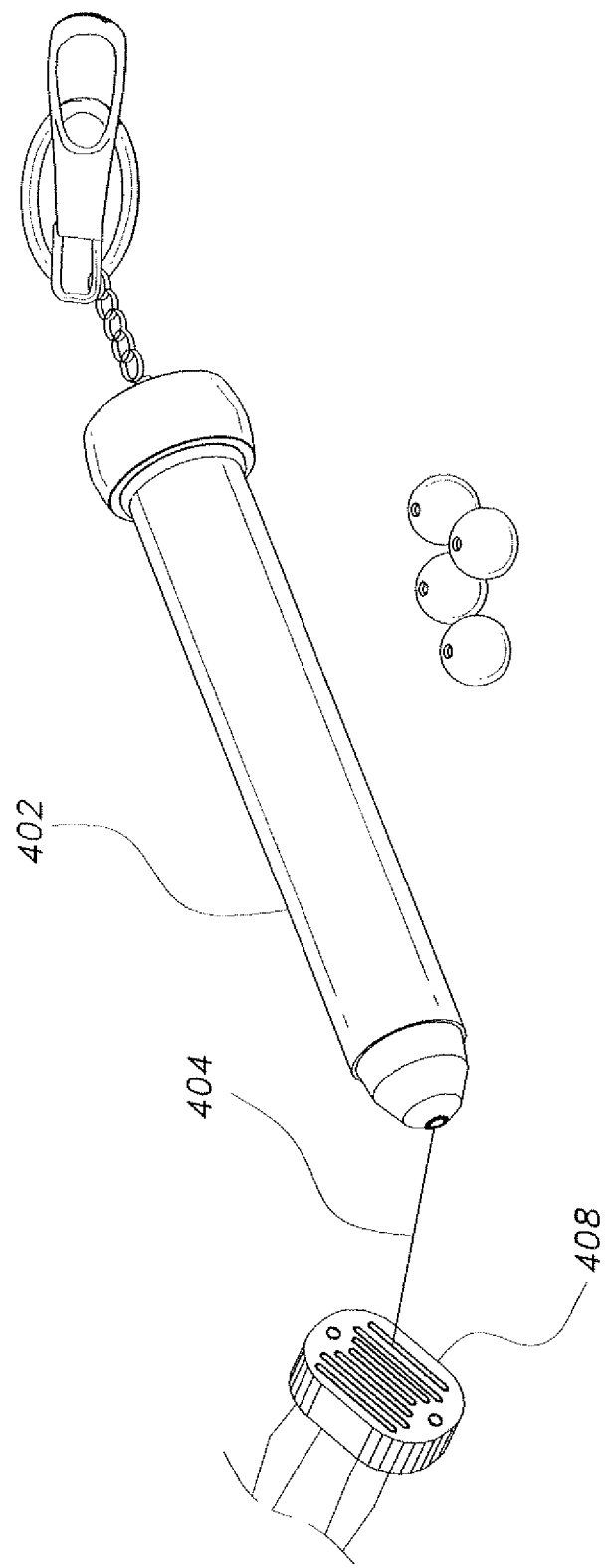
FIG. 12 is a perspective view of a laser and sensor used in a fish trap system according to the present invention.

A photoresistor sensor and laser beam system 214 is included. When the photoresistor and laser beam detection system 214 senses a fish entering the fish trap 16, the sensor instantly sends a signal to the Phidget via the waterproof cable 14. As most clearly shown in FIG. 4, the laser source 402 of the detection system 214 emits a laser beam 404 that is transmissible through a transparent protective cover 408 and impinges on the detection photoresistor 406. The laser beam 404 and the detection components are also shown in FIG. 12. Breaking of the beam 404 by a fish results in a detection signal being generated. The detection signal is then sent to the mini laptop 218 via a USB cable. Responsively, through another USB cable that is connected directly between the mini-laptop 218 and the snapshot camera 212, the laptop 218 sends a command to the snapshot web camera 212 to take the snapshot. By using the RMD software, which depends on the Internet connection that is provided by the router 220, the mini laptop 218 sends the snapshot image of the trapped fish.

The user has the choice of whether or not he/she wants to keep the fish. In the case where the user is not interested in keeping the fish, he can click on an open icon provided by the RMD software window on his Smartphone 222, thereby sending a signal automatically to the mini laptop 218, which gets sent to the Phidget circuit 216, which routes the open command via the waterproof cable 14 to the rotating gate-servomotor combination 202 that drives the gate to the exit configuration, thereby allowing the fish to escape.

An additional movable camera 210 is provided at the electronic fish trap 16 to display the region under the fish trap while submerging it into the water until it reaches the ground in order to choose the right flooring for the fish trap 16, and to display the region around the fish trap 16 constantly for experimental or recreational purposes.

Thus, the fish trap system supports a process capable of trapping fish, counting the number of fish entering the trap, taking a snapshot of them, giving a user capability to choose the fish he/she wants by using the rotating gate 202, displaying the region under the fish trap while submerging it into the water until it reaches the ground in order to choose the right flooring for the fish trap, displaying the region around the fish trap constantly for experimental or recreational reasons, and saving the fish in case the user forgets or is not able to come and take the trapped fish by opening the safety electrical exit gate 18.

Initial entrainment of the fish is performed by the coned trap mechanism 20, in which the fish enters the trap, and absent a release mechanism, are unable to get out. The coned trap mechanism 20 is basically a one-way gate in which the fish entering the trap are never able to get out. Moreover, a laser source and photoresistor sensor combination 214 is attached at the end of the inner (small) diameter of the coned gate 20. The laser beam portion of the combination 214 is positioned face-to-face with the photoresistor sensor portion of the combination 214, and they are both wired to the surface through the waterproof cable 14. If any object passes through the laser beam and interrupts it, the sensor will instantaneously detect the resulting darkness and then send a signal to the Phidget circuit 216 via the waterproof cable 14. After the fish passes the inner diameter of the coned trap mechanism 20, it will be trapped between the coned trap mechanism 20 and the rotating gate 202, and waiting for an action from the user.

Figure 5:
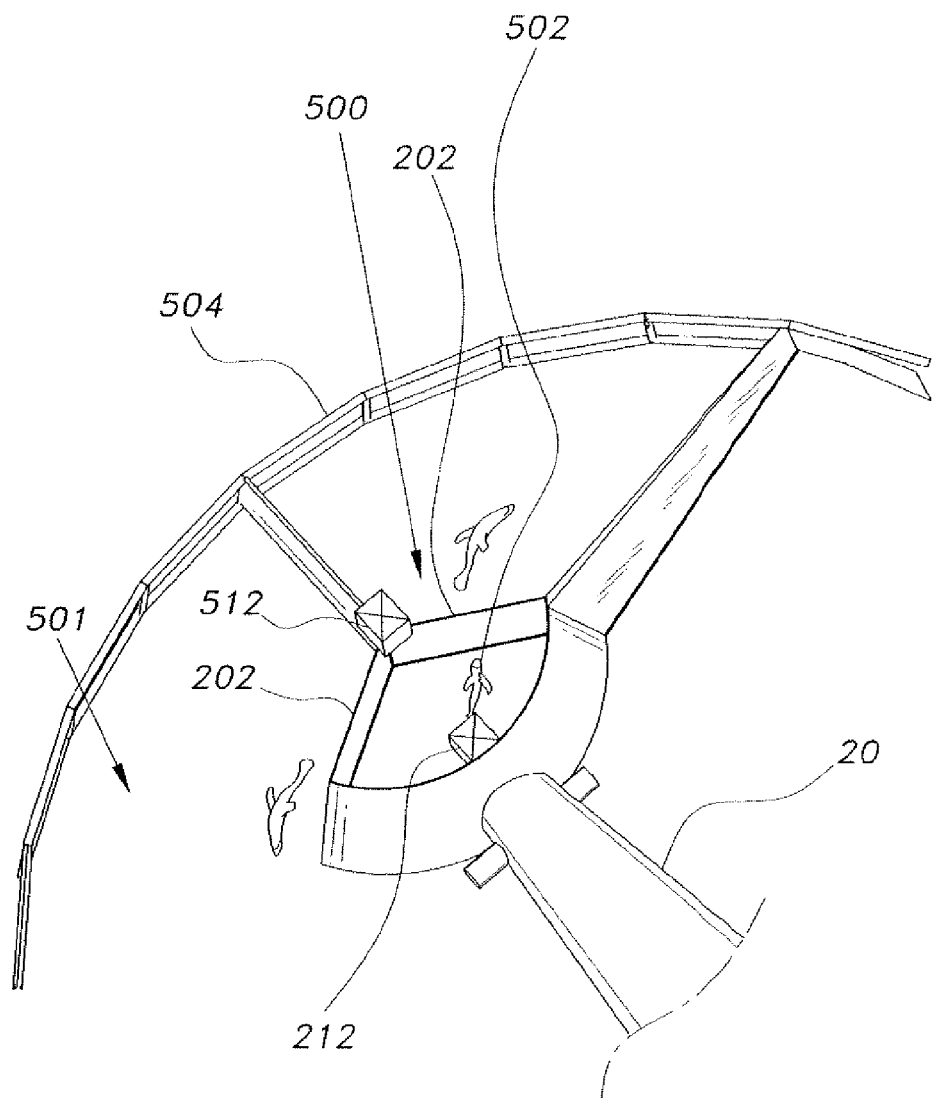
FIG. 5 is an environmental partial perspective view of a fish trap system according to the present invention.
Figure 6:
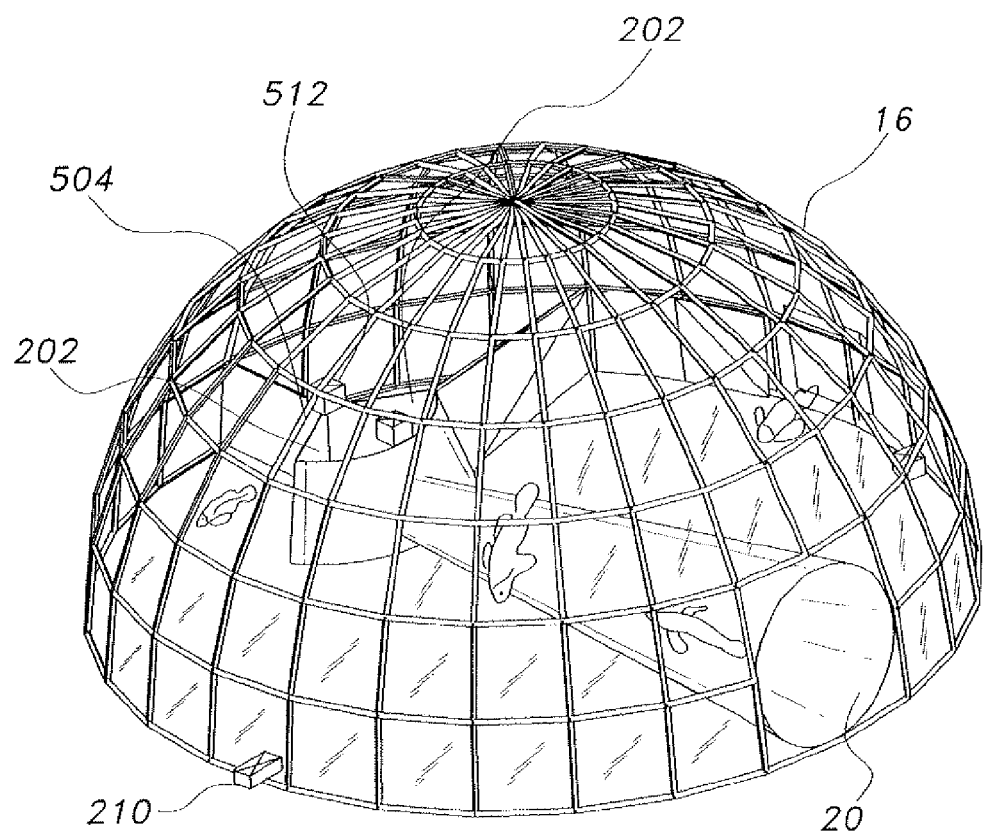
FIG. 6 is an environmental perspective view of a fish trap system according to the present invention.
Figure 11:
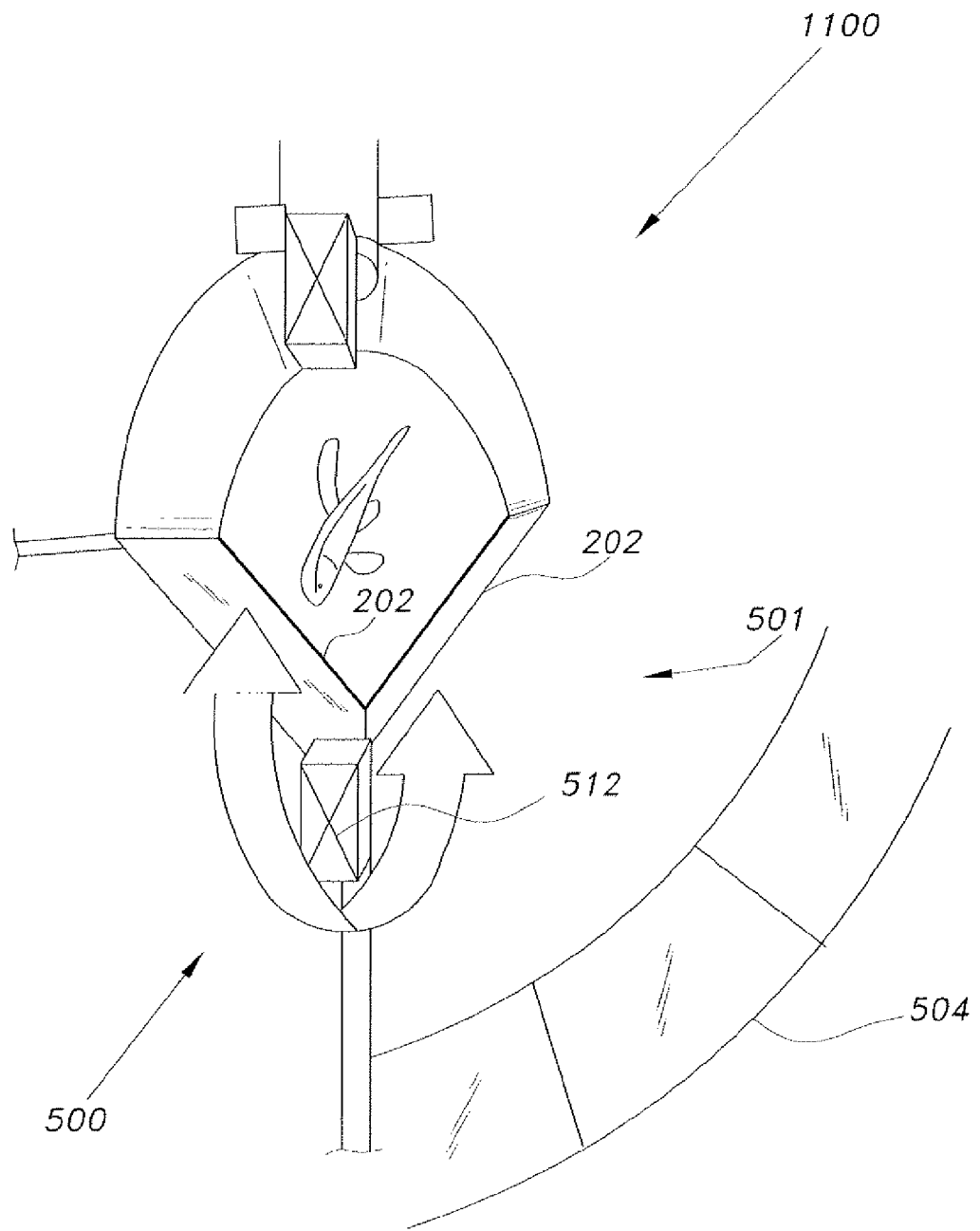
FIG. 11 is a partial perspective view of a fish trap system according to the present invention, showing the mechanism of the rotating gate.

As shown in FIGS. 5 and 11, the rotating gate 202 is similar to a revolving door. However, the rotating gate 202 has a servomotor 512 connected to it to facilitate remote controlled operation. The gate 202 has bifurcated arms joining together at a rotation axis perpendicular to the direction of travel of the bifurcated arm gate 202. The bifurcated arms are separated from each other an angular distance of 120°. Remote ends of the bifurcated arms contact a 120° stationary arcuate wall portion to form a temporary enclosure for the trapped fish. The coned trap mechanism 20 joins the stationary arcuate wall portion at an opening from the opposite side of the arcuate wall to form an entry point for fish into the temporary enclosure trap. The permanent trap area 500 is formed by an elongate stationary wall extending from one end of the arcuate wall portion of the coned trap mechanism 20 to the peripheral wall of the geodesic structure 16, and a shorter elongate stationary wall extending from the rotation axis of the gate 202 to the peripheral wall of geodesic structure 16. One of the rotatable aims of the rotating gate 202 completes the permanent trap area 500. A release area 501 is formed by the outer geodesic wall, the shorter stationary wall, and the remaining arm of the rotating gate 202. The servomotor 512 is connected at the rotation axis to cause the bifurcated arms to rotate like a revolving door. When the servomotor rotates 120° positive rotation, the fish are guided to the permanent trap area 500. On the other hand, when it rotates 120° negative rotation, the fish are retained in the release area 501. The peripheral structure 504 of the trap 16 bounds both the release and the trap areas. The configuration of the rotating gate 202 allows the user the choice if he/she wants the trapped fish (On hold trapped fish 502 in FIG. 5) or not, as shown in FIG. 5. As shown in FIG. 6, a movable camera 210 is attached to the peripheral portion of the trap 16.

The electrical signal is transmitted to the Phidget circuit 216 on the surface through a waterproof cable 14. The waterproof cable 14 contains the photoresistor sensor's wires and the laser power source's wires. It also contains the servomotor wires, all of which are connected to the Phidget 216. It also contains two USB cables for the snapshot web camera and the movable camera 210, which are directly connected to the mini-laptop 218.

The waterproof cable 14 and the wires inside should be able to withstand high mechanical tension. The waterproof cable 14 and the wires inside should be able to withstand salt water. The number of wires can be minimized if the Phidget circuit 216 and the mini-laptop 218 are installed in a small waterproof box directly attached to the fish trap because the only device that must be on the surface is the wireless router 220. The signal, which is sent by the photoresistor sensor 408 through the waterproof cable 14, is processed by the Phidget circuit 216. The Phidget circuit 216 is an interface for software run on the mini laptop 218. Therefore, the code written on the laptop 218 is applied by the Phidget circuit 216. Thus, all of the servomotors can be easily controlled through the Phidget circuit 216. Also, in case of sensors, all the signals are read through the Phidget circuit 216. During all operational steps, a web video camera 210 is used to capture the images. Thus, the web video camera 210 views the region in front of it all the time and sends the live video feed to the mini laptop 218. Using a Visual Basic (VB) program that is already compatible with the Phidget circuit 216, any trapped fish are photographed by the snapshot camera 212. Therefore, there is no need to send a signal back to the snapshot camera 212 to take the shot because the trapped fish image will be copied from the screen of the laptop 218 directly.

Figure 8:
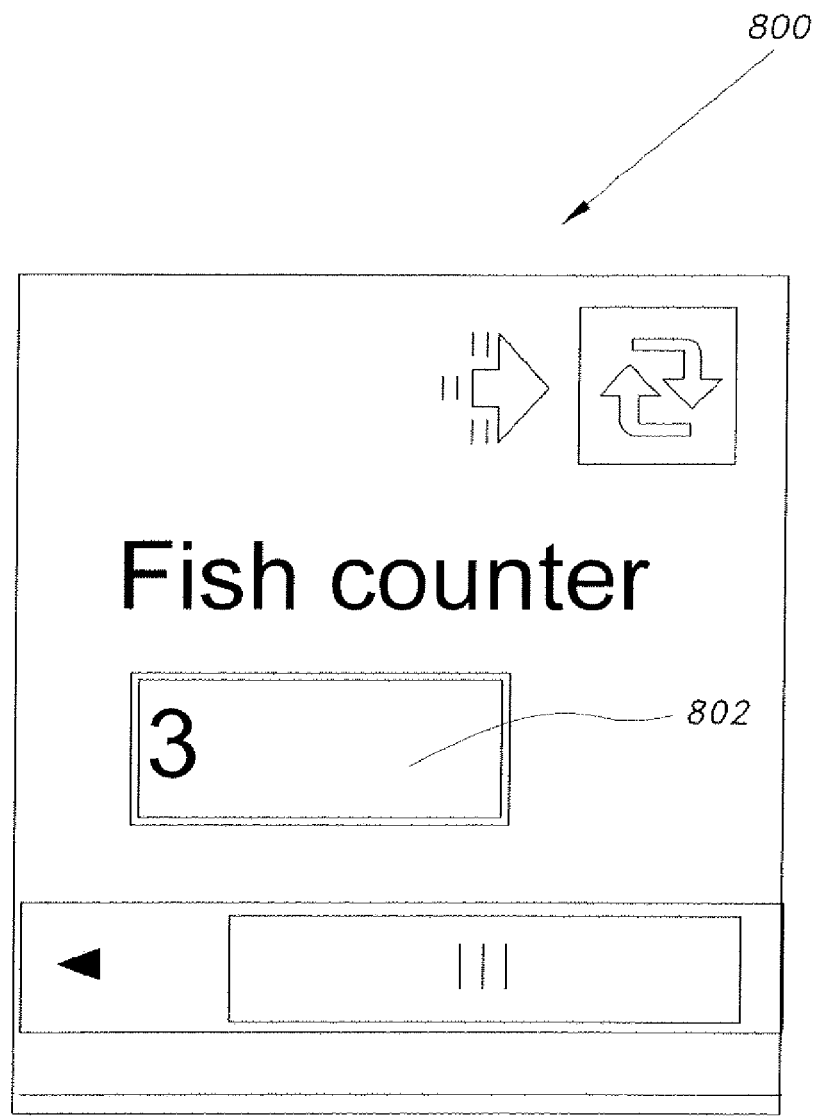
FIG. 8 is a screenshot showing a fish counter field on a monitor in a fish trap system according to the present invention.

Simultaneously, the fish counter 802 is incremented, as shown in screenshot 800 of FIG. 8. At the same time, the system sends a message to the user via email to notify him that fish are in the trap enclosure.

Additionally, Remote Control Desktop (RMD) software is installed in both the mini-laptop 218 and a personal Smartphone 222. The RMD software allows a user to view the mini-laptop 218 desktop screen by wireless transmission received on the user's Smartphone 222. RMD software uses an Internet connection to enable this desktop viewing feature, thereby allowing the user to see the number of fish and images of the fish trapped by the system (step 7).

Any device that provides a portable Internet connection, such as a wireless router 220, can be used in the system. However, the router 220 must be placed on the surface. Therefore, a buoy or float 12a is used to carry the router 220 on the surface. The float 12a has an upper cone-shaped enclosure 12b comprising a water resistant cone extending upward from the buoy or float that provides protection for the router 220, mini-Laptop 218, and the Phidget 216.

After installing the RMD application on the Smartphone 222, the user can see the desktop screen of the mini-laptop 218 on the screen of the Smartphone 222 wirelessly via an Internet connection. This means that the user can watch the shape and the number of fish received in the trap 16. Moreover, the user can also open and close both the rotating gate 202 and the safety electrically controlled exit gate 18.

Figure 9:
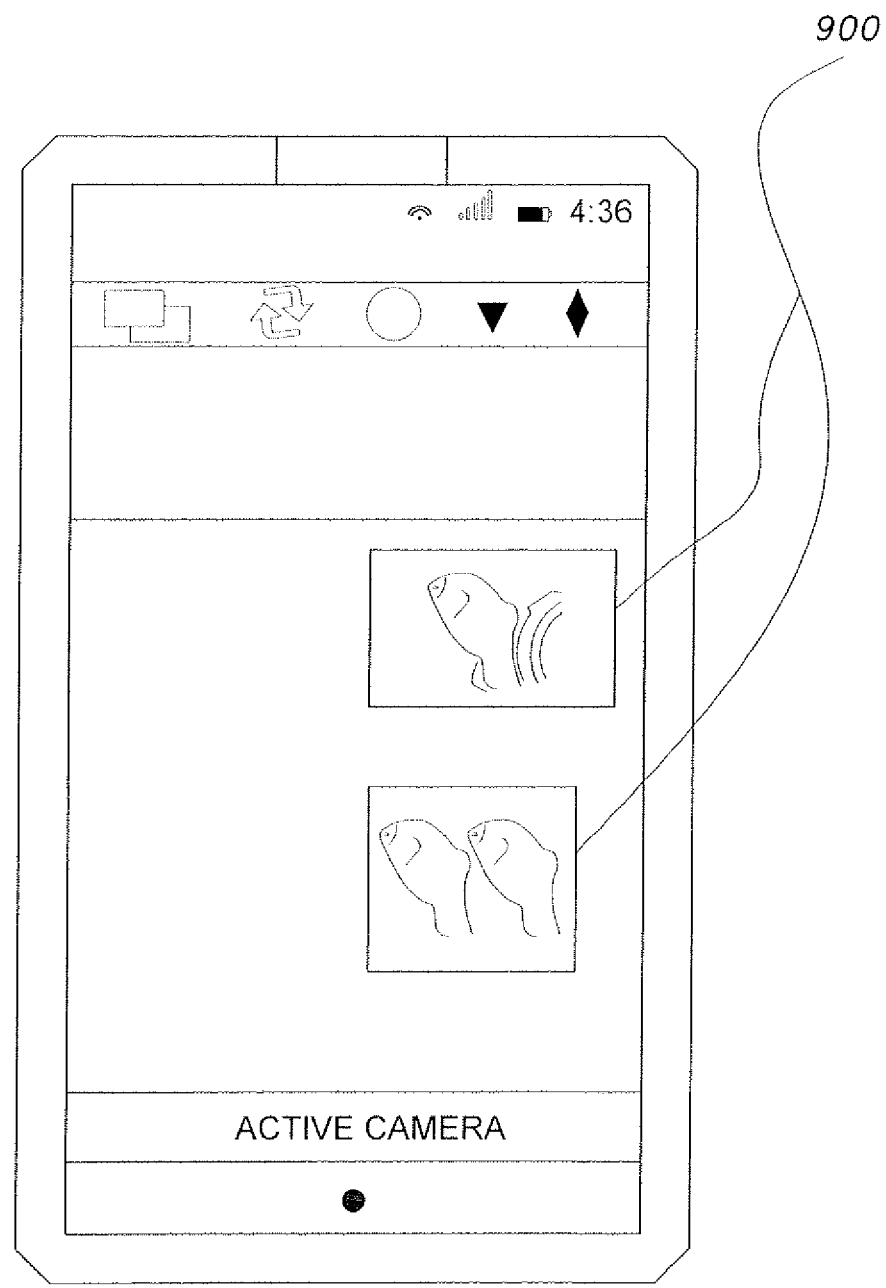
FIG. 9 is a front view of a cell phone receiving the images from a fish trap system according to the present invention.
Figure 10:
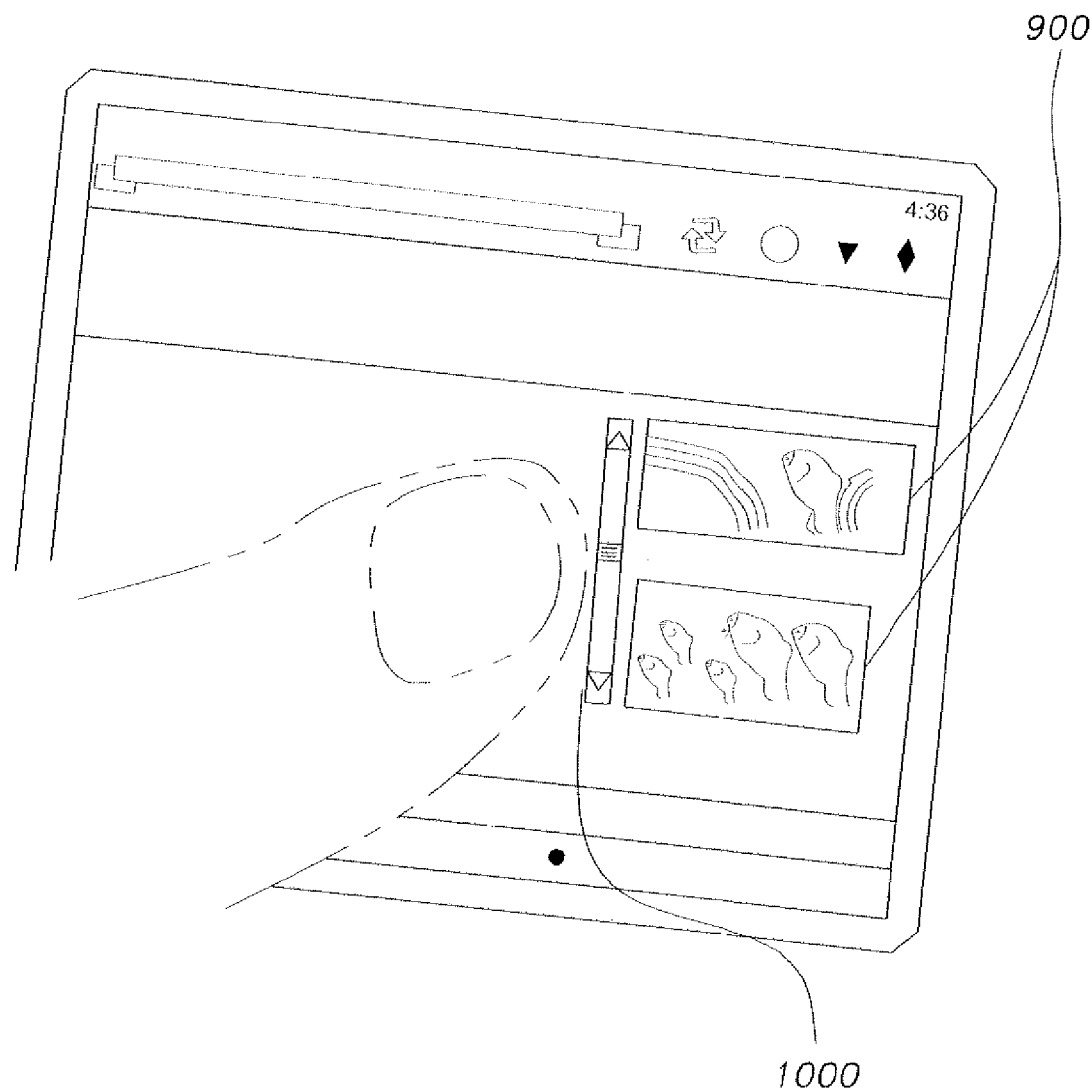
FIG. 10 is a perspective view of the cell phone of FIG. 9, showing the scrollbar that controls the rotating gate in a fish trap system according to the present invention.

In exemplary operation of the trap, a user who has viewed fish, as shown in screen shot 900 of FIG. 9, can move the scroll bar 1000 on his Smartphone screen (as shown in FIG.

10) to rotate the rotating gate 202, as shown in FIG. 11. Hence, the maximum value of the scroll bar is 120°, and the minimum value is −120°.

As shown in FIG. 2, the signal is sent to the rotating gate 202 via the router 220, the mini laptop 218, the Phidget circuit 216, the waterproof cable 14, and then to the servomotor portion of the rotating gate 202 to rotate the gate according to the user command via the scrollbar 1000 on his phone.

The rotating gate 202 will rotate in a positive direction if the user scrolled the scroll bar up to 120, which means that he wants the system to retain the on-hold trapped fish. Therefore, it will enter the trap. On the other hand if he scrolled the scroll bar down to −120, which means that he doesn't want the fish, the fish will be let out of the trap 16 via the escape door 18.

Before and/or during remote controlled operation of the revolving fish door 202, the user 11 can view the fish in the trap 16. The movable camera 210 (web camera) views the region in front of it, then sends the frontal image stream via USB through the waterproof cable 14 until the image stream reaches the Smartphone 222, which displays the live video constantly.

Figure 7:
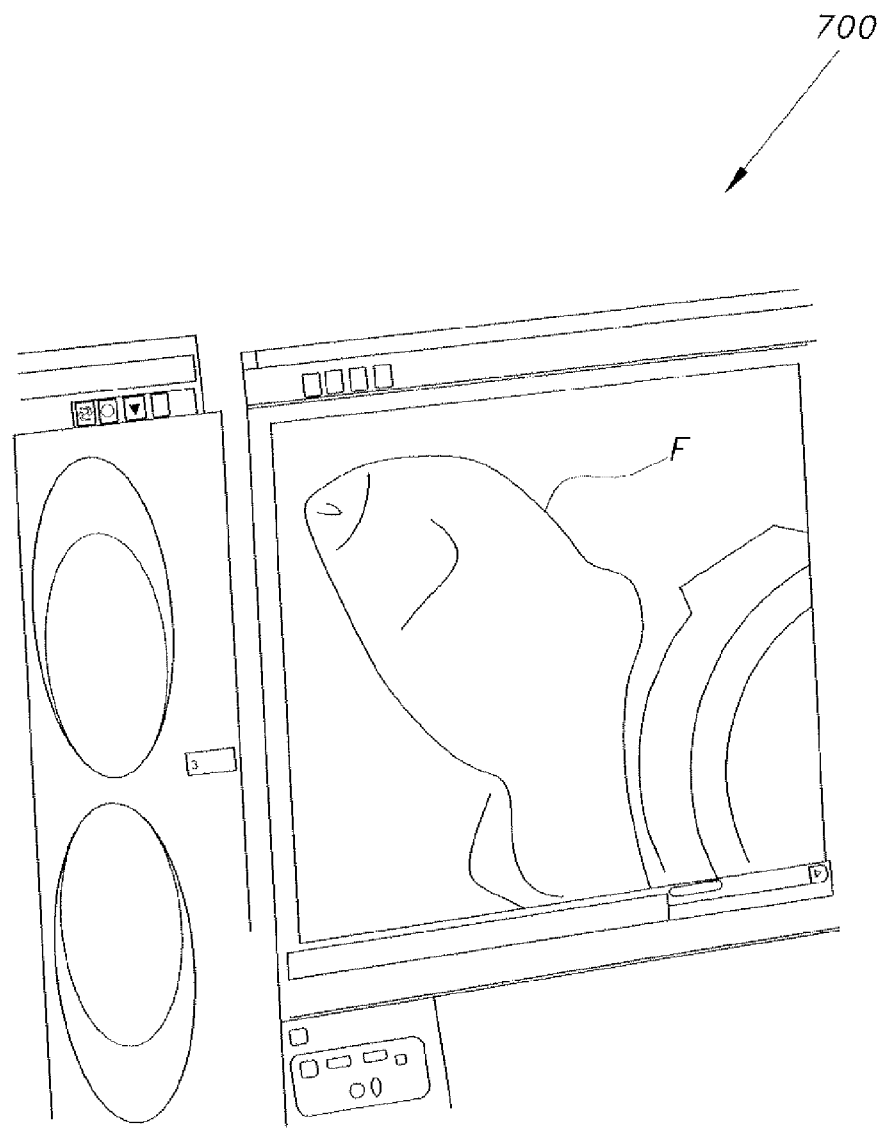
FIG. 7 is a partial perspective view of a fish trap system according to the present invention, showing a trapped fish captured on a video monitor.

The movable web video camera 210 is connected to a second servomotor, which can position the camera 180° clockwise (CW) and counterclockwise (CCW). Scrolling a scroll bar on the Smartphone 222 dedicated to the movable camera 210 causes rotation of the camera servomotor shaft, which, in turn, rotates the camera 210. The user 11 can pan the movable camera 210 to points of interest within the trap 16. For example, as shown in FIG. 7, a Smartphone screenshot 700 shows a fish F being observed in the trap. The camera servomotor used in this function is connected with a Phidget Advance Servo circuit, which is compatible with the mini Visual Basic Code.

The electrical safety gate 18 is a simple exit gate designed to release undesired fish from the trap. It is used to set the fish free in case there is no action from the user for a certain amount of time in order to save the fish from death. It can be opened manually, as well by an "open" icon on the screen of the Smartphone 222.

The bifurcated arms of gate 202, which are separated from each other by an angular distance of 120°, can have a different angular distance, such as 90° or 60°, in order for the remote ends of the bifurcated arms to form more than one temporary enclosure to trap more than one fish. In case of 90°, two fishes can be trapped in two different enclosures, and the less the angular distance, the more trapped fishes.

Tension sensor can be added to the waterproof cable 14 between the fish trap and the float 12a on the surface in order to detect if there is an overtension of the cable 14, and then send a signal to the user to warn him that someone is pulling the fish trap out of the water without permission.

In another embodiment of the invention, we can use the fish trap for birds with the same idea, only by changing the coned gate concept to a bait base concept in order to attract the bird, and the rest is the same. The power source for this project is a normal rechargeable battery, or a rechargeable battery supplied with a solar cell.

It is to be understood that the present invention is not limited to the embodiments described above, but encompasses any and all embodiments within the scope of the following claims.

I claim:

1. A fish trap system, comprising:
a submersible geodesic mesh fish enclosure;
a cone-shaped fish guideway extending radially inward from an outward end thereof at an opening in the geodesic mesh fish enclosure and tapering towards an inward end thereof within a central portion of the geodesic fish enclosure;
an arcuate wall having a first end and a second end, the tapered inward end of the cone-shaped fish guideway being connected to the arcuate wall between the first and second ends at an opening allowing fish to pass through the arcuate wall;
a pair of rotating bifurcated arms extending to meet the ends of the arcuate wall, thereby forming a temporary fish trap between the rotating bifurcated arms and a concave portion of the arcuate wall;
a first elongate wall extending from the first end of the arcuate wall to a peripheral wall of the geodesic mesh fish enclosure;
a second elongate wall extending from a rotational axis of the rotating bifurcated arms to the peripheral wall of the geodesic mesh fish enclosure, the first elongate wall, one of the bifurcated arms, the second elongate wall, and the peripheral wall of the geodesic mesh fish enclosure forming a permanent trap area for the fish, and the second elongate wall, the other one of the bifurcated arms, and the peripheral wall of the geodesic mesh fish enclosure forming a release area for the fish;
means for remotely observing the fish in the temporary fish trap, the permanent trap area, and the release area for the fish;
means for remotely rotating the bifurcated arms so that the other one of the bifurcated arms sweeps the arcuate wall from the second end of the arcuate wall to the first end of the arcuate wall, thereby transferring fish caught in the temporary fish trap to the permanent trap area;
means for remotely rotating the bifurcated arms so that the one of the bifurcated arms sweeps the arcuate wall from the first end of the arcuate wall to the second end of the arcuate wall, thereby transferring fish caught in the temporary fish trap to the release area for the fish;
a release door disposed in the peripheral wall of the geodesic mesh fish enclosure in the release area; and
means for remotely controlling opening and closing the release door, thereby controlling release of the fish from the geodesic mesh fish enclosure.

2. The fish trap system according to claim 1, wherein said bifurcated arms are disposed at an angular distance from each other, the angular distance being selected from the group consisting of 120°, 90°, and 60°.

3. The fish trap system according to claim 1, further comprising:
means for sensing fish entering said temporary trap area; and
means for transmitting the number of sensed fish to a remote user.

4. The fish trap system according to claim 1, further comprising means for warning a user when the fish trap system is being pulled out of the water by an unauthorized agent.

5. A fish trap system, comprising:
a submersible geodesic mesh fish enclosure;
a cone-shaped fish guideway extending radially inward from an outward end thereof at an opening in the geodesic mesh fish enclosure and tapering towards an inward end thereof within a central portion of the geodesic mesh fish enclosure;
an arcuate wall having a first end and a second end, the tapered inward end of the cone-shaped fish guideway being connected to the arcuate wall between the first and second ends at an opening allowing fish to pass through the arcuate wall;

a pair of rotating bifurcated arms extending to meet the ends of the arcuate wall, thereby forming a temporary fish trap between the rotating bifurcated arms and a concave portion of the arcuate wall;

a first elongate wall extending from the first end of the arcuate wall to a peripheral wall of the geodesic mesh fish enclosure;

a second elongate wall extending from a rotational axis of the rotating bifurcated arms to the peripheral wall of the geodesic mesh fish enclosure, the first elongate wall, one of the bifurcated arms, the second elongate wall, and the peripheral wall of the geodesic mesh fish enclosure forming a permanent trap area for the fish, and the second elongate wall, the other one of the bifurcated arms, and the peripheral wall of the geodesic mesh fish enclosure forming a release area for the fish;

at least one rotatable camera disposed in the geodesic mesh fish enclosure, the at least one rotatable camera being rotatable to observe the fish in the temporary fish trap, the permanent trap area, and the release area for the fish;

means for remotely rotating the at least one rotatable camera;

means for remotely receiving image frames transmitted from the at least one rotatable camera;

means for remotely rotating the bifurcated arms so that the other one of the bifurcated arms sweeps arcuate wall from the second end of the arcuate wall to the first end of the arcuate wall, thereby transferring fish caught in the temporary fish trap to the permanent trap area;

means for remotely rotating the bifurcated arms so that the one of the bifurcated arms sweeps the arcuate wall from the first end of the arcuate wall to the second end of the arcuate wall, thereby transferring fish caught in the temporary fish trap to the release area for the fish;

a release door disposed in the peripheral wall of the geodesic mesh fish enclosure in the release area; and means for remotely controlling opening and closing of the release door, thereby controlling release of the fish from the geodesic mesh fish enclosure.

6. The fish trap system according to claim 5, wherein said bifurcated arms are disposed at an angular distance from each other, the angular distance being selected from the group consisting of 120°, 90°, and 60°.

7. The fish trap system according to claim 5, wherein said at least one camera comprises a video camera.

8. The fish trap system according to claim 7, further comprising:

means for sensing fish entering said temporary trap; and
means for transmitting the number of sensed fish to a remote user.

9. The fish trap system according to claim 5, wherein said system further comprises a digital still camera.

10. The fish trap system according to claim 5, further comprising means for warning a user when the fish trap system is being pulled out of the water by an unauthorized agent.

11. A fish trap system, comprising:

a submersible geodesic mesh fish enclosure having a peripheral wall;

a cone-shaped fish guideway extending radially inward from an outward end thereof at an opening in the geodesic mesh fish enclosure and tapering towards an inward end thereof within a central portion of the geodesic mesh fish enclosure;

an arcuate wall having a first end and a second end, the tapered inward end of the cone-shaped fish guideway being connected to the arcuate wall between the first and second ends at an opening allowing fish to pass through the arcuate wall;

a pair of rotating bifurcated arms extending to meet the ends of the arcuate wall, thereby forming a temporary fish trap between the rotating bifurcated arms and a concave portion of the arcuate wall;

a first elongate wall extending from the first end of the arcuate wall to the peripheral wall of the geodesic mesh fish enclosure;

a second elongate wall extending from a rotational axis of the rotating bifurcated arms to the peripheral wall of the geodesic mesh fish enclosure, the first elongate wall, one of the bifurcated arms, the second elongate wall, and the peripheral wall of the geodesic mesh fish enclosure forming a permanent trap area for the fish, and the second elongate wall, the other one of the bifurcated arms, and the peripheral wall of the geodesic mesh fish enclosure forming a release area for the fish;

at least one rotatable camera disposed in the geodesic mesh fish enclosure, the at least one rotatable camera being rotatable to observe fish in the temporary fish trap, the permanent trap area, and the release area for the fish;

a servomotor connected to the at least one rotatable camera to control rotation of the at least one rotatable camera;

a waterproof cable connected to the servomotor and the at least one rotatable camera for rotational control of the at least one rotatable camera and image transmission by the at least one rotatable camera, the waterproof cable extending from the geodesic mesh fish enclosure to a point above the geodesic mesh fish enclosure close to a surface of a body of water in which the geodesic mesh fish enclosure is submerged;

a buoy disposed on the surface of the body of water;

a USB sensing and control circuit connected to the waterproof cable;

a processor having a direct USB connection to the waterproof cable and a connection to an output of the USB sensing and control circuit;

a wireless router disposed on the buoy above the surface of the body of water and connected to the processor, the wireless router being connected to a wireless network;

a remote WLAN-enabled device connected to the network configured for receiving image frames transmitted from the at least one rotatable camera and transmitting rotation commands to the servomotor of the at least one rotatable camera through the network;

means for sensing fish entering the temporary trap;

means for transmitting the number of sensed fish to the remote user;

means for remotely rotating the bifurcated arms so that the other one of the bifurcated arms sweeps the arcuate wall from the second end of the arcuate wall to the first end of the arcuate wall, thereby transferring fish caught in the temporary fish trap to the permanent trap area;

means for remotely rotating the bifurcated arms so that the one of the bifurcated arms sweeps the arcuate wall from the first end of the arcuate wall to the second end of the arcuate wall, thereby transferring fish caught in the temporary fish trap to the release area for the fish;

a release door disposed in the peripheral wall of the geodesic mesh fish enclosure in the release area; and means for remotely controlling opening and closing of the release door, thereby controlling release of the fish from the geodesic mesh fish enclosure.

12. The fish trap system according to claim 11, wherein said bifurcated arms are disposed at an angular distance from each other, the angular distance being selected from the group consisting of 120°, 90°, and 60°.

13. The fish trap system according to claim 11, wherein said at least one camera comprising a video camera.

14. The fish trap system according to claim 13, wherein said USB sensing and control circuit is disposed on said buoy above the surface of the body of water.

15. The fish trap system according to claim 13, wherein said processor is disposed on said buoy above the surface of the body of water.

16. The fish trap system according to claim 15, wherein said processor is a laptop computer.

17. The fish trap system according to claim 13, wherein said buoy further comprises a water resistant cone extending upward from said buoy, the water resistant cone protecting contents of said buoy from the weather.

18. The fish trap system according to claim 11, wherein said system further comprises a digital still camera.

19. The fish trap system according to claim 11, further comprising means for warning a user when the fish trap system is being pulled out of the water by an unauthorized agent.

20. The fish trap system according to claim 11, further comprising means for adapting the fish trap system to trap birds instead of fish.

* * * * *